Sept. 22, 1925. 1,554,267
R. G. EWING
DRAWING SHEET GLASS
Filed April 5, 1920  2 Sheets-Sheet 1
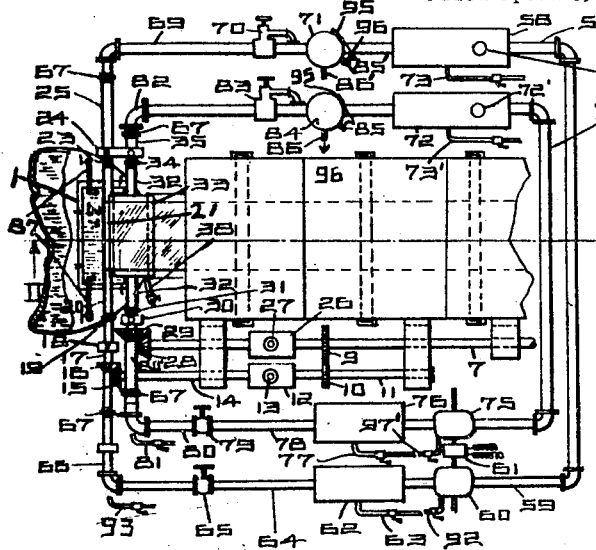
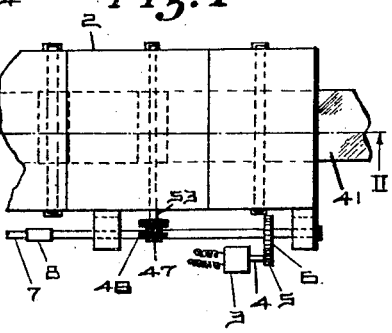
*Fig.1*
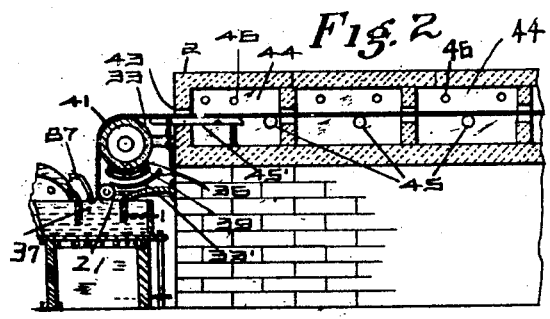
*Fig.2*
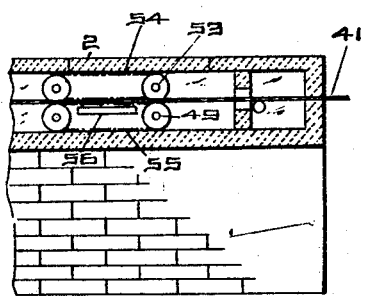
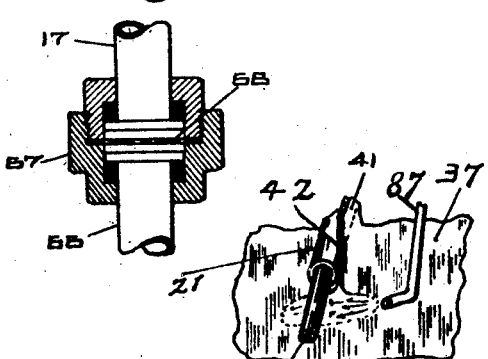
*Fig.3*
*Fig.5*
*Fig.4*
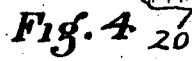
Robert G Ewing
Inventor Sept. 22, 1925.     R. G. EWING     1,554,267
DRAWING SHEET GLASS
Filed April 5, 1920     2 Sheets-Sheet 2
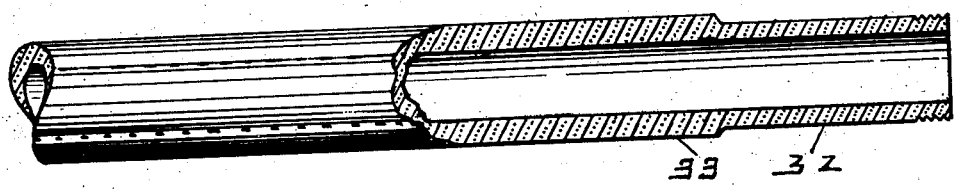
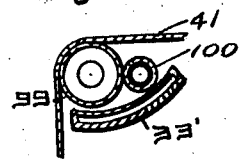
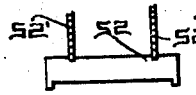
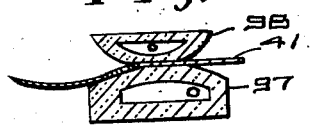
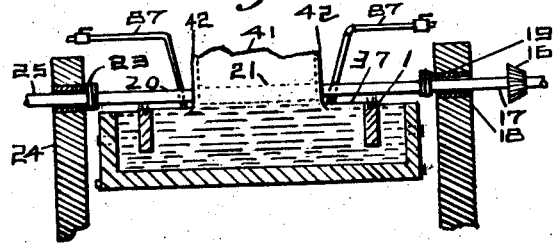
Robert G Ewing
Inventor Patented Sept. 22, 1925.

1,554,267

UNITED STATES PATENT OFFICE.

ROBERT G. EWING, OF TOLEDO, OHIO; BEATRICE AMELIA ALEXANDRINA EWING, EXECUTRIX OF SAID ROBERT G. EWING, DECEASED, ASSIGNOR TO THE LIBBEY-OWENS SHEET GLASS COMPANY, OF TOLEDO, OHIO, A CORPORATION OF OHIO.

DRAWING SHEET GLASS.

Application filed April 5, 1920. Serial No. 371,501.

*To all whom it may concern:*

Be it known that I, ROBERT G. EWING, a subject of the King of Great Britain, residing at Toledo, Lucas County, Ohio, have invented new and useful Improvements in Drawing Sheet Glass of which the following is a specification.

This invention relates to drawing sheet glass from a molten mass.

This invention has utility when incorporated in continuous sheet glass drawing, not only in directing the glass from the vertical draw from the molten mass, but in gauging the width of the sheet as well as the thickness of the sheet from the draw.

Referring to the drawings:

Fig. 1 is a plan view, with parts broken away, of an embodiment of the invention in a sheet glass drawing machine;

Fig. 2 is a section on the line II—II, Fig. 1;

Fig. 3 is a detail view, partly in section, of a pipe coupling to a roll;

Fig. 4 is a detail view showing the application of a burner to reduce the surface tension of a pool of glass.

Fig. 5 is a detail view of the drive for progressing the sheet glass through the leer;

Fig. 6 is a partly broken away bending roll of porous material;

Fig. 7 is a detail of reinforcing material for the bending roll of Fig. 6, when such is deemed desirable;

Fig. 8 is a partly broken away metallic roll for the gauging operation;

Fig. 9 is an embodiment showing the bending and gauging rolls upon opposite sides of the sheet;

Fig. 10 is a view of a bait and chain for drawing the sheet glass in starting to draw the glass from the pool;

Fig. 11 is a view showing a sheet of glass having margins extending beyond the contact surface of the gauge roll;

Fig. 12 is a view showing the application of a porous roll as a feeder for lubricant to a bending roll; and Fig. 13 is a view of the porous material feature of lubricant supply embodied in a flattening table and block.

In the carrying out of the invention as herein disclosed, there is shown a well 1, of a glass tank similar to that disclosed in U. S. Patent 1,240,185 granted to R. G. Ewing, Sept. 18, 1917. The well 1 is disposed adjacent a leer 2, and near the discharge end of the leer 2 is shown a motor 3 having a shaft 4, carrying pinion 5, in mesh with a gear 6, fixed with a shaft 7, extending longitudinally along the side of the leer 2. This shaft 7, intermediate its extent has a coupling 8, therein permitting relative longitudinal movement of the shaft sections to take care of expansion conditions.

Near the receiving end of the leer 2, shaft 7 has thereon a gear 9 in mesh with gear 10 upon a shaft 11, parallel with the shaft 7. This shaft 11 extends into a gear shift box 12, similar to motor vehicle transmissions having a gear shift handle 13, whereby the speed may be varied of the driven shaft 14 as actuated from the shaft 11. This shaft 14 carries a terminal bevel pinion 15 in mesh with bevel pinion 16 on tubular shaft 17, mounted in bearing 18. This tubular shaft 17 has coupling 19 with reduced portion 20 of gauge roll 21, say of nickel alloy, to be driven from the bevel gear 16.

This gauge roll 21, is connected on the opposite side of the glass well 1 by a coupling 23 adjacent bearing 24 to tubular shaft 25.

The shaft 7, beyond the gear wheel 9, enters variable speed transmission or gear shift box 26 having a shift handle 27 for varying the speed of driven bevel gear 28 in mesh with bevel gear 29. This bevel gear 29 is adjacent bearing 30 which has inward therefrom coupling 31 connecting shaft portion 32 of bending roll 33 to be driven from this bevel gear 29.

The bending roll 33 may be of material porous at its working temperature, such as fine pressed carbon formed into a graphite roll 33, (Fig. 6). In practice, it is desirable to lubricate the surface of this bending roll 33, and in order that this lubricant be not dissipated too freely by direct heat of the pool, a hollow shield 33' is spaced between roll 33 and the pool 37. This lubricant may be a wax of volatile hydro-carbon or carbon compound substance, preferably of a high boiling temperature which when applied to the surface of the bending roll 33 with the hot glass passing thereover expands the fluid which exerts an equal pressure in all directions, thus forming a cooling fluid cushion for the glass in the sliding of the glass over the bending roll 33.

On the opposite side of the glass well 1 from the coupling 31 the smaller extension 32 of the bending roll 33 is connected by coupling 34 with tubular shaft 35 carried by pedestal bearing 24.

The bore 22 of the gauge roll 21, (Fig. 8) is herein shown as tapered in order that the supply receiving portion of the bore may have a smaller radiation surface with a gradually increasing radiation surface throughout the bore to the discharge end. The increasing temperature of the fluid or liquid passing therethrough may thus be compensated by additional radiation surface during operation and may equably regulate the temperature of the glass contacting surface of such roll.

Carbon compounds having a high boiling point and fluid at the work-temperature of the glass sheet are preferred for lubricants, as they may be used at higher temperatures than say water and are not as subject to vapor pressure globules.

Water may be used as a lubricant for sheet glass, and with water as a lubricant a fibrous porous roll 33 say of wood is preferred, and with water the liquid of roll 33, such water should be heated before lubricating the glass sheet and even then there is danger of damaging the glass sheet on account of the rapid drop of temperature. There is also danger of charring the roll 33 and rendering it useless.

In lubrication, care must be exercised that the surface contacting the glass sheet be not too freely moistened. With an excess of moisture, vapor pressure confines liquid globules which prevent an even pressure in all directions between the sheet and roll 33 and these liquid globules pit or even fracture a thin sheet.

To overcome the above objection means is provided by which these globules may be dispelled before reaching the glass sheet. A vaporizer 36, preferably of hollow metal, as iron, may have a contacting surface to fit closely under a portion of the arc of roll 33 from end to end above the pool 37 (Fig. 2).

Entering the bore of vaporizer 36 is burner 38, that heat may be supplied for the vaporizer and burnt gases pass therefrom through vents 39.

In operation with a lubricant which may form globules on the glass contacting surface of roll 33, the vaporizer 36, pressing against the surface of the roll 33, upon being sufficiently heated for actual contact with the liquid, either by hot gases from pool 37, or by means of burner 38, may cause the globules of the lubricant to be expressed by vaporization, (as in ironing), thus leaving an even cushion of fluid for surfacing the glass.

Vaporizer 40, as a revoluble roll, is preferably heated internally, and in operation, it may present a continuously renewed heat surface for vaporizing the globules (Fig. 9).

In the drawing of a more or less plastic section from a pool of glass, there is a thicker portion near the pool, and the contour of the surfaces from the pool is of a progressively diminishing curvature. The diminishing of this curvature may be checked by lowering the temperature of the rising glass, thus adding strength thereto by means of greater viscosity.

In order that high speed may be attained in drawing, roll 21 is so mounted that it contacts the rising glass near the pool 37, say not to exceed one inch therefrom for a high speed of draw of the sheet from the pool 37, which contact point may be further removed from the surface of the pool for a relatively slow draw of the sheet, and thus located may absorb heat from the rising glass and initially gauge the thickness thereof by giving thereto additional viscosity and strength.

In order that the forming sheet may be of equal gauge and strength throughout its breadth, the roll 21 contacts the full width of the sheet 41, beyond which there may be a small margin of glass 42, say of about one-half inch width on each edge, (Fig. 11) which margins 42 form obtuse inward angles to the plane of the sheet 41, thus overlapping the roll 21 and forming marginal supports against transverse inward draw of the sheet 41.

The overlapping margins 42 will not radiate as much of their heat as the contact portion of the sheet 41, which may in a measure compensate for additional radiation from the edges as the sheet progresses to the leer 2.

The sheet of glass rising from the thicker portion, passes above gauge roll 21, and may in its ascent then pass over the bending roll 33, for delivery through opening 43 into leer 2, which is provided with a plurality of chambers 44, having sustaining rolls 45 for the sheet of glass. The temperature of the respective chambers 44 may be controlled by burners 46.

The sheet of glass 41, 42, being perfectly flat as delivered from the marvering roll 33 to the adjacent flat top surface 45', may upon passage over the support retain such flat form and be gradually reduced in temperature thereon sufficiently that it may, by consequent added viscosity and strength with the tension of pull, retain its flat form suspended from support 45' to the first supporting roll 45, between which supports 45' and 45, there may be sufficient heat loss of the glass that it may retain its plane when in contact with the first roll 45.

The shaft 7, adjacent the motor 3, carries a worm 47, (Fig. 5) in mesh with worm gear 48 on shaft 49. This shaft 49 has fixed therewith gear wheel 50 in mesh with gear wheel 51 on upper shaft 53. This upper shaft 53 drives upper travelling apron 54, while lower shaft 49 drives opposing lower travelling apron 55 over sustaining bed 56 so that between these two travelling aprons 54, 55, there may be progressed the continuous sheet of glass 41, 42, in drawing through the leer 2. A heated bait 52, (Fig. 10) may be immersed in the pool 37 and drawn by flat chains 52' passing between belts 54, 55, in starting operations for drawing a sheet 41 of glass from the pool 37.

In order that lubrication may be effective, the lubricant is preferably heated and the porous roll 33 revolved at a speed differing from that of the glass passing thereover, so that the sheet of glass 41, 42, may have a pressure or "ironing" imparted against its surface, as in marvering, which marvering action is mostly due to said relative speed and size of roll 33, with consequent enforced slippage between the sheet of glass and the roll 33.

The roll 33 being of porous material, may have the lubricant fed to the internal bore thereof and pass through its walls, by capillary attraction or pressure to dampen the exterior surface thereof for the glass engagement.

In the control of the temperature of the gauge roll 21, there is provided a circulating system, herein shown as comprising a reserve tank 58 having a filler opening 58' for replenishing the system, from which tank leads a pipe line 59 to rotary pump 60, driven by motor 61, for delivering the fluid to air-chamber 62, thereby regulating the flow of the fluid. A burner 63 may be regulated to control the temperature of the fluid in the chamber 62. From this chamber 62 extends pipe 64, flow control through which is governed by valve 65. From valve 65 extends pipe line 66 which is connected to tubular shaft 17 by coupling 67 having anti-friction bearing 68 therein, (Fig. 3).

The tubular shaft 17, after passing through the bearing 18, is connected to the smaller portion 20 of the gauge roll 21 by the coupling 19.

On the opposite side of well 1 from coupling 19, the reduced portion of the gauge roll 21 is connected by the coupling 23 to tubular shaft 25, which after passing through bearing 24, is connected by a second anti-friction coupling 67 to pipe line 69. This delivery pipe line 69, having therein an adjustable automatic pressure by-pass valve 70, discharges into cooling chamber 71, the temperature of which may be controlled by the circulation of water or other cooling medium.

There is accordingly provided a passage for liquid or fluid flow into the taper bore of gauge roll 21, which liquid or fluid may act as a temperature controlling medium for the gauge roll in its function of absorbing heat from the contacting sheet of glass 41.

As reserve tank 58 is connected to the cooler 71, discharge from the pipe line 69 may flow into the tank 58 completing the circulating system.

To provide a circulating system for the lubrication of the marvering roll 33, there is shown herein a reserve tank or reservoir 72 with filler opening 72' having burner 73' thereunder for control of temperature of lubricant therein.

The reservoir 72 is connected by pipe line 74 to rotary pump 75 which is also driven by the motor 61.

The pump 75 is connected to air chamber 76 in order that an even flow may be maintained therefrom into pipe 78 in which is valve 79 adjusted to control the flow to pipe line 80 which is connected to tubular shaft 80' by anti-friction bearing joint 67. Beyond the bearing 30, this tubular shaft 80' is connected by the coupling 31 to the reduced portion 32 of the roll 33.

With a lubricant such as paraffin wax to supply the marvering roll 33, the supply line is regulated as to heat by means of the burner 73' for the tank 72, and the air-chamber 76 with the burner 77, while the pipe line from the air chamber to the roll 33 may be heated by burner 81 and the pump 75 by burner 97'.

That the lubricant supplied to the marvering roll 33 may also act as a tempering medium therefor, there is provided a passage for liquid or fluid flow to the coupling 34 on the opposite side of well 1, from coupling 31. The other reduced portion 32 of the roll 33 is connected by the coupling 34 to the tubular shaft 35 which passes through bearing 24 and is connected to a pipe line 82 by means of an anti-friction coupling 67. This pipe line 82, having therein an adjustable automatic pressure by-pass valve 83, discharges to cooling chamber 84, the temperature of which may be controlled by the circulation of water or other cooling medium, by means of intake pipe 85, and discharge pipe 86. In like manner, the chamber 71 of the parallel circulatory system may have an intake pipe 85' and a discharge pipe 86'.

As the reserve tank 72 is coupled to the cooler 84, discharge from the pipe line 82 may flow into the tank 72, completing the circulating system for the marvering roll.

The pool 37 may, by operation of burners 87, have its surface tension reduced at the margins to which emerge the thicker portions to form edges 42 of the sheet, thus relieving the cohesion between the pool of glass 37 and the margins of the thicker portions emerging therefrom shown in detail Fig. 4.

In some instances, the porous roll may be provided with internal reinforcement, as metal split collars 89 having kerfs or fingers 90 therefrom (Fig. 7). The terminal or reduced portions of such roll may be further reinforced by an outer split collar 91.

That the temperature of the circulating liquid or fluid may be determined as to warmth, for gauge roll 21 burners may be supplied, herein shown as burner 73, to supply heat to reservoir 58, and burner 73' to supply heat to reservoir 72, burner 92, for the pump 60, burner 63 supplying heat to chamber 62, and heat supplied to pipe line 66 by means of burner 93.

The temperature of the circulating lubricant may in practice be automatically controlled by means of pyrometer 95 acting on valve 96 of the cooling medium intake pipe 85 of the cooler 84.

The temperature of the cooler 71 may be controlled by pyrometer 95 acting on valve 96 of intake pipe 85' of the cooler, thus regulating the flow of the cooling medium, and consequent control of the temperature of the circulating fluid that may in operation regulate the temperature of the gauge roll 21. As reserve tank 58 is connected to the cooler 71, discharge from the pipe line 69 may flow into the tank 58 completing the circulating system.

The gauge roll and marvering roll may be so located that one surface of a rising sheet of glass 41 comes into contact with the gauge roll, and thereafter the other surface of the sheet contacts the roll 33 (Fig. 9) and with such construction the uncooled surface of the sheet 41 contacts the marvering roll 33, and there may be a less intervening travel for the sheet from the roll 21 to the roll 33, it being desirable that the sheet retain sufficient heat for marvering. Moreover, with a lubricant having a low boiling temperature, it is necessary that the contacting sheet 41 be of a high enough temperature to prevent fracture thereof.

In the use of the word "contact" as to relation of the sheet of glass and the lubricated roll, there is no actual contact or touch, there being an intervening vapor space between the roll and sheet of glass.

The speed of the gauge roll relative to the speed of the passing glass sheet, may also be a factor in heat absorption from the sheet.

As a feature of this invention, there is shown in the flattening of sheet glass, a sheet of glass 41 drawn between a flattening table 97 (Fig. 13) of porous material, and a porous flattening block 98 through the walls of which table 97, a lubricant may be fed to the lower surface of the glass sheet, and through the wall of the block 98 may be fed to the upper surface of the glass sheet, and thereby form films having even pressure in all directions for the sheet of glass to be pressed between flattening and adding viscosity and stiffening the sheet.

Instead of the bending roll being porous, the distribution of the lubricant may be effected upon bending roll 99, say of metal, from a porous lubricant supplying roll 100 (Fig. 12) in contact with the roll 99.

What is claimed and it is desired to secure by Letters Patent is:

1. In the drawing of sheet glass from a molten mass, the process of partially setting the sheet adjacent its source by directly contacting the sheet surface with a smooth cooling member without destroying the sheet surface or deflecting the sheet from its line of draw.

2. In combination with apparatus for drawing a sheet of glass from a mass of molten glass, a smooth surfaced cylindrical cooling roller substantially as long as the sheet width and positioned in contact with one face of the sheet near its source.

3. In the drawing of sheet glass, a refractory porous glass engaging member having a chamber, and means for supplying fluid to the chamber for delivery through the member.

4. In the drawing of sheet glass, a hollow fluid-containing porous bending roller.

5. Sheet glass drawing apparatus comprising a reservoir for a pool of molten metal, a porous refractory bending roll, means to supply fluid to the interior of the roll and thence to the glass-contacting surface, and driving means for rotating the roll.

6. In the drawing of sheet glass, a hollow porous rotary roll having a fluid reservoir, means to feed fluid into said reservoir.

7. In a sheet glass drawing apparatus a temperature affected roll for extending transversely of a sheet of glass, said roll having internal radiation surface increasing inwardly of the sheet from an edge of the sheet of glass.

8. In a sheet glass drawing apparatus a temperature affected porous roll for extending transversely of a sheet of glass, said roll having internal radiation surface increasing inwardly of the sheet from an edge of the sheet and means for supplying lubricant into said roll.

9. In the manufacture of sheet glass, the supplying of a liquid to lubricate the glass and vaporizing the liquid to eleminate pressure "globules" from gathering in contact with the glass.

In witness whereof I affix my signature.

ROBERT G. EWING.